Aug. 27, 1968   D. SCARAMUCCI   3,398,926
VALVES AND SEALS THEREFOR

Filed Feb. 1, 1965   3 Sheets-Sheet 1

INVENTOR.
DOMER SCARAMUCCI
BY
Dunlap & Laney
ATTORNEYS

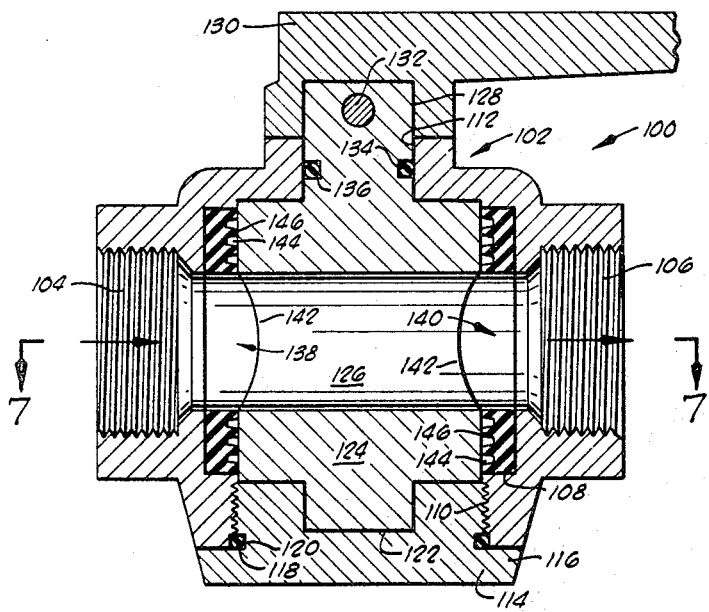
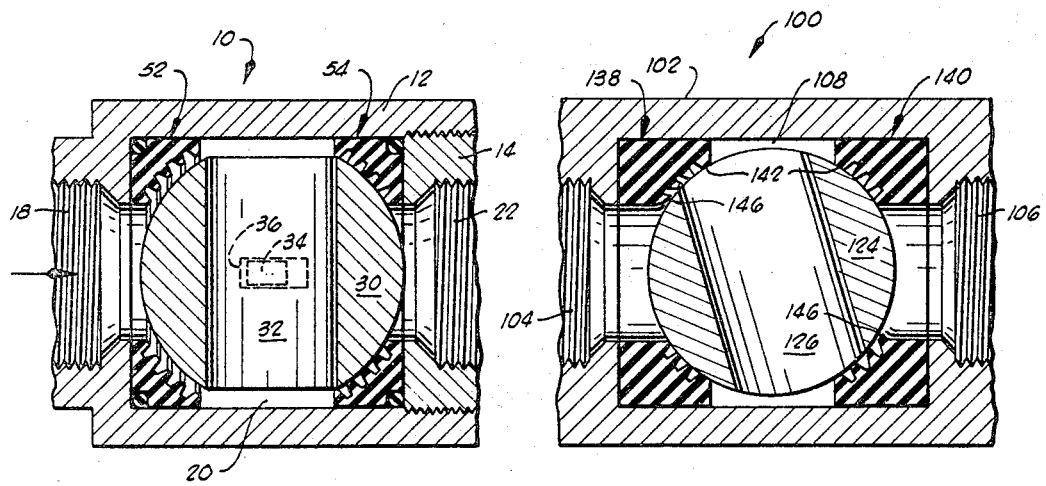
INVENTOR.
DOMER SCARAMUCCI
BY
Dunlap & Laney
ATTORNEYS

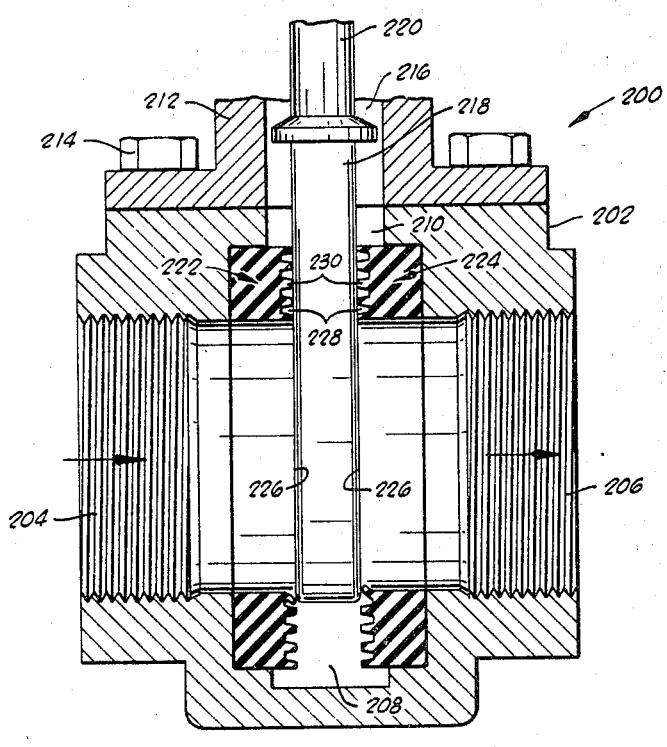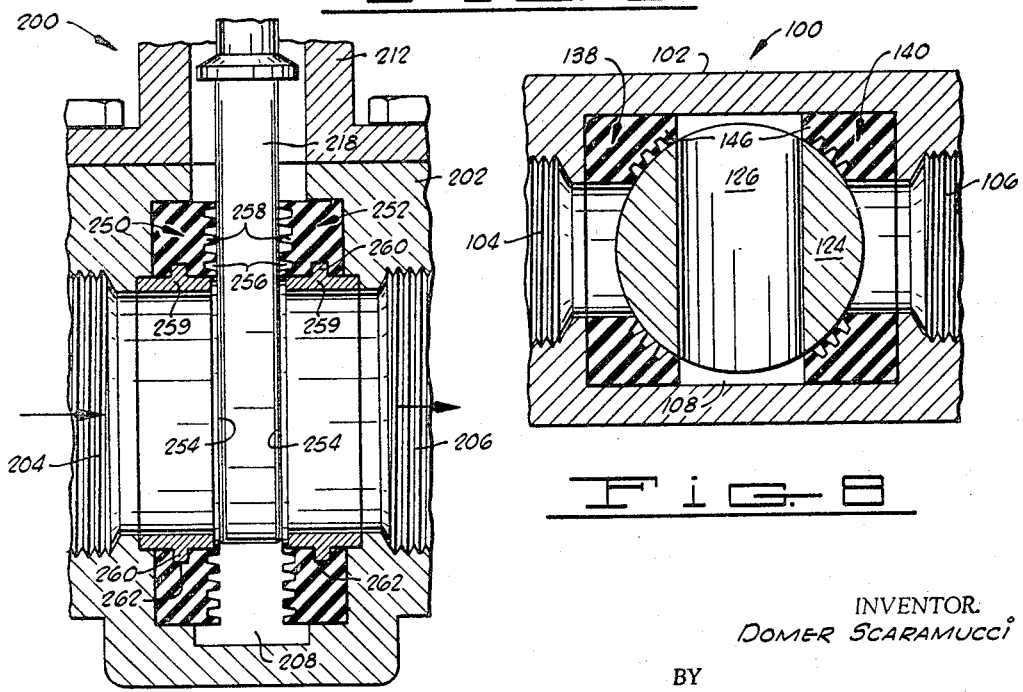

tion of Oklahoma
United States Patent Office 3,398,926
Patented Aug. 27, 1968

3,398,926
VALVES AND SEALS THEREFOR
Domer Scaramucci, Oklahoma City, Okla., assignor to Balon Corporation, Oklahoma City, Okla., a corporation of Oklahoma
Filed Feb. 1, 1965, Ser. No. 429,287
14 Claims. (Cl. 251—172)

ABSTRACT OF THE DISCLOSURE

A valve containing annular, resilient seals around the inlet and outlet providing seals between the valve member and body, wherein the face of each seal engaging the valve member has a plurality of annular grooves therein providing a plurality of pockets for receiving foreign matter scraped from the valve member and providing a plurality of sealing lands engaging the valve member.

---

This invention relates generally to improved valves for use in fluid handling systems. More particularly, but not by way of limitation, this invention relates to an improved valve incorporating improved valve seals therein.

Most valves, constructed in the past, have depended upon the deformation of the seals located between the valve member and the valve body to provide for fluid-tight closure of the valve, thereby preventing the flow of fluid between the valve body and valve member. In some valves, the entire surface of the seal engages the valve member and is deformed thereby, while in others a bead or lip projecting from the seal engages and is deformed by the valve member to effect the fluid-tight seal.

With the seals constructed from resilient material, that portion of the seals disposed adjacent the valve member moves into the space that the valve member normally occupies when the valve is closed. Therefore, the seals are engaged by the valve member during closure and are subject to shearing forces as the valve member moves relative to the valve body. It has been well established that most of the wear and seal damage occurs in such valves during the closure of the valve, and, more particularly, at or near the point of closure of the valve.

When the seals in those valves are formed from a highly resilient material, such as natural rubber or other soft elastomers, the sealing lip or bead thereon may be driven by fluid pressure into the path of the valve member as it is closed. Frequent opening and closing of the valve often results in damage or destruction of the seal whereby fluid will flow therethrough, thus rendering the valve inoperative.

Constructing the seals from a harder resilient material alleviates the afore-described problem to some extent, but the use of such materials increases the difficulty of obtaining a fluid-tight seal at low pressures. Also, the harder seal materials are less flexible and are, therefore, very susceptible to damage due to foreign materials carried by the fluid becoming imbedded therein.

When the service application of the valves involves the handling of relatively high pressure fluid, the softer and more flexible materials are subjected to being extruded from the valve or having the sealing lips thereof deformed into the flow opening through the valve member and, therefore, subjected to damage during closure of the valve. To alleviate this problem, the highly resilient seals have been provided with rigid reinforcing members that are generally constructed from metal. Naturally, the inclusion of the metal reinforcing in the seals increases the cost of the seals and, consequently, the cost of the valves. Harder seal materials can be utilized in high pressure service because of their higher load bearing characteristics without necessitating the use of reinforcing materials, but as previously mentioned, they most often do not produce a satisfactory low pressure seal and are susceptible to damage if the valve is to be opened and closed frequently.

Generally, this invention provides an improved valve incorporating seals therein that may be constructed from either relatively soft elastomers or from harder seal materials. The seals provided by this invention are disposed in the valve between the valve member and valve body and are in sealing engagement with the valve body. The seals have a surface thereon disposed adjacent the valve member that is adapted to sealingly engage the valve member when the valve is closed. Furthermore, the surface of the seal adjacent the valve member is provided with a plurality of grooves defining a plurality of lands having a relatively small surface area. The small surface of the lands sealingly engages the valve member to form a highly effective seal at both low and high pressures. The seals are sized so that the lands do not extend into the path of the valve member thereby alleviating the possibility of damage during closure of the valve member but are of sufficient size to sealingly engage the valve member when the valve is closed.

It is, therefore, one object of the invention to provide an improved valve having seals therein that have increased load bearing characteristics, while retaining the desired sealing characteristics.

Another object of the invention is to provide an improved valve having seals that do not move into the path of the valve member during closure of the valve, thereby extending the service life of the valve.

Another object of the invention is to provide an improved valve having seals therein that do not require flexural stress or compressive deformation to form a fluid-tight seal, thereby extending the service life of the valve.

A further object of the valve is to provide an improved valve having seals therein that form an effective fluid-tight seal at both high and low pressures.

Still another object of the invention is to provide an improved valve that can be easily and economically manufactured.

The foregoing additional objects and advantages of the invention will become more apparent as the following description is read in conjunction with the accompanying drawings wherein like reference characters denote like parts in all views and wherein:

FIG. 4 is a cross-sectional view similar to FIG. 2 and showing the valve member in the closed position;

FIG. 6 is a vertical cross-section of a plug valve, constructed in accordance with the invention;

FIG. 7 is a cross-section of the valve of FIG. 6 taken generally along the line 7—7 of FIG. 6, but showing the valve member rotated toward the closed position;

FIG. 8 is a view similar to FIG. 7, but showing the valve member in the fully closed position;

FIG. 9 is a vertical cross-sectional view of a portion of a gate valve, also constructed in accordance with the invention; and, FIG. 10 is a view similar to FIG. 9, but showing a reinforcing that may be used with seals constructed in accordance with the invention.

EMBODIMENT OF FIG. 1

Figure 1:
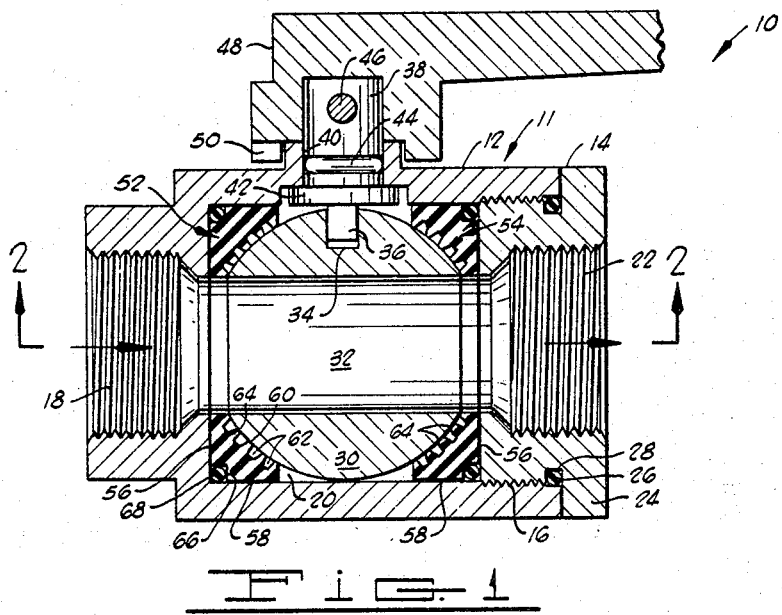
FIG. 1 is a vertical cross-section of a ball valve, constructed in accordance with the invention.

Referring to the drawing and FIG. 1 in particular, shown therein and generally designated by the reference character 10 is a ball valve constructed in accordance with the invention. The valve 10 includes a valve body 11 having an inlet portion 12 threadedly attached to an outlet portion 14 as shown at 16.

A partially threaded inlet 18 in the inlet portion 12 is in communication with an enlarged chamber 20 formed therein. The outlet portion 14 includes a partially threaded outlet 22 that is also in communication with the chamber 20. An annular flange 24 extends around the periphery of the body portion 14 and is arranged to abut one end of the inlet portion 12 to determine the depth that the outlet portion 14 extends into the valve body 11. An annular sealing ring 26 is disposed in a groove 28 extending around the outlet portion 14 adjacent the flange 24 to prevent the leakage of fluid from the chamber 20 through the threads 16.

A valve ball 30 is positioned in the chamber 20 and is provided with an opening 32 extending therethrough. With the valve 30 disposed in the chamber 20 as shown in FIG. 1, the inlet 18, opening 32, and outlet 22 form a flow passageway that extends through the valve 10. The valve ball 30 is provided on its upper exterior surface with a rectangular recess 34 that is adapted to receive the rectangular end 36 of the valve ball operating member 38.

Figure 2:
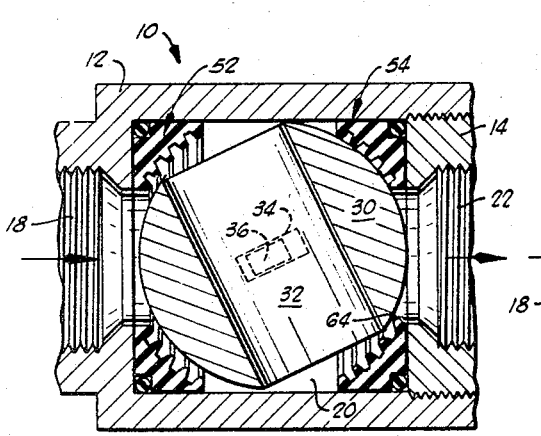
FIG. 2 is a cross-sectional view of the valve of FIG. 1, taken generally along the line 2—2 of FIG. 1, but showing the valve member rotated toward the closed position.

As may be seen more clearly in FIG. 2, the rectangular recess 34 has approximately the same width as the rectangular end 36 of the operating member 38, but the recess 34 is considerably longer than the end 36 to permit movement of the valve ball 30 with respect to the operating member 38 in a direction parallel to the flow passageway. The operating member 38 extends through an opening 40 in the inlet portion 12. An annular flange 42 on the lower portion of the operating member 38 is provided to limit the extent of upward movement of the operating member 38 in the valve body 11. An O-ring seal 44 encircles the operating member 38 in sealing engagement with the inlet portion 12 to prevent the flow of fluid from the chamber 20 through the opening 40 between the operating member 38 and the inlet portion 12.

The upper end of the operating member 38 is provided with a pin 46 to attach a handle 48 to the operating member 38. The handle 48 includes a lug 50 that is adapted to engage one or more abutments (not shown) on the valve body 11 to limit the rotational movement of the handle 48 and, consequently, of the valve ball 30 to approximately ninety (90°) degrees.

An upstream seal 52 is disposed in the chamber 20 adjacent the inlet 18. A downstream seal 54 is also disposed in the chamber 20, but is adjacent the outlet 22. The seals 52 and 54 are identical in structure through oppositely disposed in the chamber 20.

Each of the seals 52 and 54 includes a pair of surfaces 56 and 58 that, in the preferred form of the invention, are in sealing engagement with the valve body 11. It should be noted that the surface 56 of the downstream seal 54 is in engagement with the outlet portion 14 while the surface 56 of the upstream seal 52 is in engagement with the inlet portion 12. The surfaces 58 are each in sealing engagement with the inlet portion 12.

Each of the seals is also provided with a surface 60 that is configured to fit the valve ball 30 and in, the preferred form of the invention, to be in substantially the same plane as the surface of the valve ball 30. The surface 60 includes a plurality of grooves 62 defining a plurality of lands 64. The grooves 62 are widest at the surface 60 so that the lands 64 have a trapezoidal cross-sectional configuration. The portion of each land 64 lying in the surface 60 is the smallest surface on the land 64 and is in sealing engagement with the valve ball 30.

Each of the seals 52 and 54 is also provided with an annular groove 66 that is sized to receive a resilient annular seal 68, such as an O-ring, that forms a fluid-tight seal between the seals 52 and 54 and the valve body 11.

In the preferred form of the seals 52 and 54, the surface 60 lies in the same spherical plane as the exterior surface of the valve ball 30. Stated in another way, surface 60 of the seals 52 and 54 is configured so that the lands 64 will be in very light sealing engagement with the exterior of the valve ball 30.

However, when the seals 52 and 54 are installed in a valve, such as the valve 10 illustrated in FIG. 1, wherein the valve ball 30 is floating, the seals 52 and 54 may be completely free from engagement with the valve ball 30 when the valve 10 is in the open position. Should the seals 52 and 54 be installed in a ball valve wherein the valve ball is guided, i.e., the valve ball cannot move other than in rotation, the seals will be in light sealing engagement with the valve ball as illustrated in FIG. 1.

For low pressure applications of the valve 10, the seals 52 and 54 may be satisfactorily constructed from a relatively soft elastomer such as natural rubber, synthetic rubber or soft resilient plastic materials. If the valve 10 is to be installed in service applications wherein it is anticipated that relatively high pressures will be encountered, the seals 52 and 54 are preferably constructed from a relatively hard elastomer such as natural or synthetic rubber having a hardness of from 80 to 90 durometer or from a resilient synthetic resin, such as Teflon, Nylon or Delrin.

Operation of the embodiment of FIG. 1

FIG. 1 illustrates the valve 10 in the open position, that is, with the opening 32 in the valve ball 30 aligned with the inlet 18 and the outlet 22 in the valve body 11. As illustrated therein, the upstream seal 52 and downstream seal 54 are in engagement with the valve ball 30. The engagement of the seals 52 and 54 with the valve ball 30 supports the valve ball 30 in the chamber 20.

As shown in FIG. 2, the valve ball 30 has been rotated to a position partially closing the flow passageway through the valve 10. Due to the restriction of fluid flow through the valve 10, the valve ball 30 has been shifted slightly toward the downstream seal 54. The movement of the valve ball 30 toward the downstream seal 54 is possible due to the relative sizes of the recess 34 and rectangular end 36 of the operating member 38 and due to a slight deformation of the downstream seal 54.

As shown in the lower right hand portion of FIG. 2, fluid flow through the opening 32 in the valve ball 30 has deformed the land 64 of the downstream seal 54 adjacent the outlet 22 out of the path of the valve ball 32 permitting a small amount of flow to continue through the valve 10. The movement of the land 64 is sufficient so that the valve ball 30 will not engage the land during closure of the valve 10 preventing the possibility of damage to the downstream seal 54 during closure.

As shown in FIG. 2, the upstream seal 52 is completely relaxed because it is not in engagement with the valve ball 30 and will not, therefore, be subjected to wear during the closure of valve 10. It should also be pointed out that the space illustrated as existing between the surface of valve ball 30 and the upstream seal 52 has been exaggerated for purposes of illustrating the operation of the valve 10. It has been found in tests performed with the seals constructed as described, that the deformation of the downstream seal 54 will be relatively small and, with the seals 52 and 54 in engagement with the valve ball 30, the actual movement of the valve ball 30 toward the downstream seal 54 will be relatively small. The exact amount of deformation of the downstream seal 54 and movement of the valve ball 30 will depend on the material used in the seals 52 and 54 and the pressure existing in the inlet 18.

Figure 3:
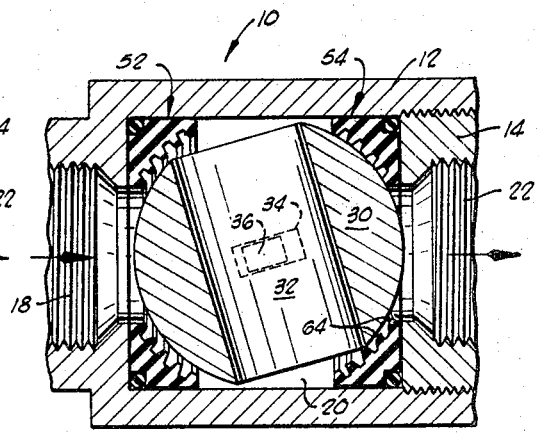
FIG. 3 is a view similar to FIG. 2 and showing the valve member in a different operating position.

As illustrated in FIG. 3, the valve ball 30 has been rotated still farther toward the closed position of the valve 10. It will be noted therein that the valve ball 30 has shifted slightly toward the upstream seal 54 under the influence of fluid pressure in the inlet 18.

As shown most clearly in the lower right hand portion of FIG. 3, the two lands 64 adjacent the outlet 22 have been deformed away from the surface of the valve ball 30 by fluid flowing through the opening 32 in the valve ball 30 so that the valve 10 is not yet fully closed. Fluid pressure in the chamber 20 and inlet 18 must be relatively high as compared to the pressure in the outlet 22 to deform both of the lands 64 away from the valve ball 30 as illustrated and as will be discussed more fully in connection with the description of FIG. 5.

FIG. 4 illustrates the valve 10 in the fully closed position, that is, when the opening 32 in the valve ball 30 is disposed at a substantially right angle to the flow passageway through the valve 10. As shown therein, the valve ball 30 has shifted toward the downstream seal 54 and is fully engaged therewith. By virtue of the shifting of the valve ball 30, the fluid pressure in the inlet 18 enters the chamber 20 between the upstream seal 52 and the surface of the valve ball 30 and is exerted on the valve ball 30 attempting to shift it more tightly into engagement with the downstream seal 54. The fluid pressure in the chamber 20 is also exerted on the lands 64 of the downstream seal 54 thereby forming a fluid-tight downstream seal in the valve 10.

In this connection, it should be pointed out that if the valve ball 30 were guided, that is, if it were pivotally mounted in the valve 10 whereby the valve ball 30 could not shift toward the downstream seal 54, the upstream seal 52 would also be in engagement with the valve ball 30 forming an upstream seal therewith as well as the downstream seal formed by the seal 54 with the valve ball 30. This will be described more completely in connection with the embodiment of FIG. 6.

Figure 5:
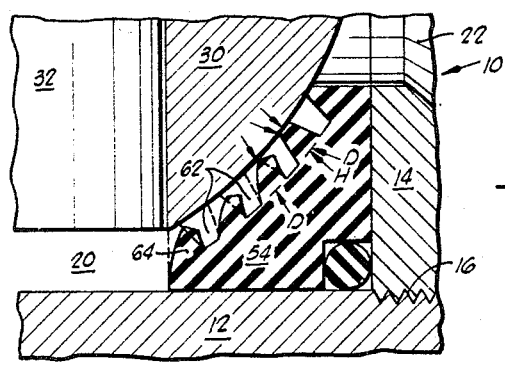
FIG. 5 is an enlarged view of a portion of the valve of FIG. 1, illustrating the principle of operation of the seals therein.

FIG. 5 illustrates in more detail the principle of operation of the downstream seal 54 when the valve ball 30 is in the fully closed position. As shown therein, the valve ball 30 has been shifted into sealing engagement with the downstream seal 54 and fluid pressure is present in the chamber 20 as previously described. It should also be assumed for the purpose of explaining the operation of the seal 54, that each of the lands 64 has sufficient structural strength to withstand a differential pressure thereacross of approximately 100 p.s.i. Also, it should be assumed that the land height is illustrated by the dimension H and that the dimension from the center of the land, which is assumed to be the center of rotation of the land 64, to one edge of the land 64 lying in the surface 60 has a dimension D. It can be appreciated from viewing FIG. 5 that the dimension D is greater than the dimension H.

As shown in FIG. 5, the first land 64 adjacent the opening 32 in the valve ball 30 is illustrated as being deformed out of engagement with the valve ball 30. Similarly, the second land 64 has also been deformed out of engagement by the valve ball 30 due to the influence of pressure in the chamber 20. To deform the first land 64 out of engagement with the valve ball 30 the pressure differential between the chamber 20 and the first groove adjacent the first land 64 must be at least 100 p.s.i. When this value is exceeded the first land 64 will be deformed out of engagement with the valve ball 30 as illustrated.

To deform the second land 64 out of engagement with the valve ball, a pressure differential of at least 100 p.s.i. must also exist between the grooves on either side thereof. Therefore, for the first and second lands 64 to be deformed out of engagement with the valve ball, the pressure differential between the chamber 20 and the groove 62 on the downstream side of the second land 64 must be at least 200 p.s.i. It can, therefore, be seen that for fluid to flow past the downstream seal 54, a differential pressure between the chamber 20 and the outlet 22 must be at least 500 p.s.i. in order to deform the five lands 64 illustrated on the downstream seal 54. Manifestly, as the lands 64 are made less flexible by virtue of the use of harder seal material, a greater differential pressure must exist across each of the lands 64 in order to move them out of sealing engagement with the valve ball 30.

Another principle of operation of the seals constructed in accordance with the invention is also illustrated in FIG. 5. It should be noted that the center land 64 on the downstream seal 54 has been deformed slightly toward the outlet 22. However, since the dimension D is greater than the height H of the lands 64, the initial influence of fluid pressure deformation on the lands 64 is to move the lands into tighter sealing engagement with the valve ball 30.

The trapezoidal configuration of the lands 64 presents a relatively narrow surface thereon for sealingly engaging the valve ball 30 and at the same time provides the maximum structural strength in deformation to support the compressive load exerted by the valve ball 30 thereon. The grooves 62, in addition to providing the relatively flexible lands 64, provide a plurality of spaces into which foreign materials that are adhered to the valve ball 30 can be deposited when they are scraped from the surface of the valve ball 30 during closure thereof.

From the foregoing, it can be seen that the particular configuration of seals described will provide an effective low pressure seal by virtue of the narrow, annular lands 64 that engage the valve ball 30 and yet provide a relatively high pressure seal by virtue of their additive effect with respect to the pressure differential existing across the seal. In addition to the sealing characteristics of the seals, there is also presented a structural configuration that provides the maximum load bearing quality to the seals commensurate with the sealing ability thereof. Due to the fact that the configuration of the seals in the unstressed condition is substantially identical to the configuration of the seals in the stressed condition, it can be seen that no portion of the seal will be moved into the path of the valve ball during closure thereof, thereby alleviating the possibility of seal damage.

EMBODIMENT OF FIG. 6

Referring now to FIG. 6, shown therein and generally designated by the reference character 100 is a plug valve also constructed in accordance with the invention. As shown therein, the plug valve 100 includes a valve body 102 having a partially threaded inlet 104, a partially threaded outlet 106 and an enlarged chamber 108 connected with the inlet 104 and outlet 106.

The lower end of the valve body 102 has a threaded opening 110 extending therethrough and the upper end of the valve body 102 has an opening 112 extending therethrough for purposes which will become more apparent hereinafter.

A threaded valve cap 114 is screwed into the threaded opening 110 and is provided with an annular flange 116 on the periphery thereof that engages the valve body 102 to limit the distance that the cap 114 is screwed into the valve body 102. The cap 114 is also provided with a recess 122 that receives the lower end of a cylindrical plug 124.

A resilient seal 118 is disposed in an annular groove 120 formed in the cap 114 adjacent the flange 116. The purpose of the seal 118 is to prevent the escape of fluid from the chamber 108 between the valve body 102 and the cap 114.

The plug 124 is disposed in the chamber 108 and has an opening 126 extending therethrough. The opening 126 when aligned with the inlet 104 and outlet 106 forms a flow passageway through the valve 100. An upper end 128 of the plug 124 projects upwardly therefrom through the opening 112 formed in the valve body 102 and is connected at its upper end with a valve handle 130 by a pin 132.

An O-ring seal 134 is disposed in an annular recess 136 formed in the end portion 128 of the plug 124. The O-ring seal 134 sealingly engages the upper end 128 of the plug 124 and the valve body 102 within the opening 112 to prevent the escape of fluid from the chamber 108 therebetween.

A resilient annular upstream seal 138 and a resilient annular downstream seal 140 are disposed in the chamber 108 in sealing engagement with the valve body 102. The seals 138 and 140 are identical in configuration though oppositely disposed in the valve 100. The upstream seal 138 is disposed adjacent the inlet 104 and the downstream seal 140 is disposed adjacent the outlet 106 in the valve body 102.

Each of the seals 138 and 140 has a surface 142 in sealing engagement with the cylindrical plug 124. The surface 142 is provided with a plurality of annular grooves 144 defining a plurality of annular lands 146. The lands 146 are trapezoidal in cross-sectional configuration and has the smallest surface thereon in sealing engagement with the plug 124. Conversely, the grooves 144 are widest adjacent the surface 142, that is, adjacent the plug 124, thereby affording the maximum structural strength to each of the lands 146.

It should be pointed out the seals 138 and 140 are preferably in light sealing engagement with the plug 124 and are, therefore, illustrated in FIG. 6 both in the stressed and unstressed conditions. Stated in another way, the seals 138 and 140 are sized so that they will sealingly engage the plug 124 but will not extend into the path of the plug 124 even when in the relaxed or unstressed condition of the seals.

The seals 138 and 140 are constructed from the same materials mentioned in connection with the description of the seals 52 and 54 of FIG. 1.

*Operation of the embodiment of FIG. 6*

As shown in FIG. 6, the plug valve 100 is in the fully open position, that is, the opening 126 in the plug 124 is aligned with the inlet 104 and outlet 106 in the valve body 102. As the handle 130 is rotated, the plug 124 is rotated therewith moving the plug 124 into the position shown in FIG. 7.

As shown therein, the plug 124 is nearing the closed position, but it can be seen that the fluid pressure in the inlet 104 is sufficient to deform the lands 146 on the upstream seal 138 and the lands 146 on the downstream seal 140 adjacent the opening 126 to permit a small amount of fluid flow to continue through the valve 100. It is important to note that the lands 146, as illustrated in the upper left hand and lower right hand corners of FIG. 7, are deformed away from the path of plug 124, thereby preventing damage to the lands 146 during movement of the plug 124 toward the closed position. It should also be pointed out that if the pressure in the inlet 104 is relatively low and the seals 138 and 140 are formed from relatively hard materials, fluid-tight closure of the valve 100 is attained upon the rotation of the plug 124 to a position wherein the first land adjacent the inlet 104 and outlet 106 of the seals 138 and 140 are in engagement with the valve plug 124.

FIG. 8 illustrates the valve 100 in the closed position, that is, the opening 126 in the plug 124 is at ninety (90°) degrees relative to the flow passageway through the valve 100. As shown in FIG. 8, an upstream and downstream and downstream fluid-tight seal is formed in the valve 100 between the plug 124 and the upstream seal 138 and the downstream seal 140, respectively.

From the structural description of the valve 100, it will be remembered that the plug 124 is restrained in the valve body 102 against movement therein parallel to the flow passageway through the valve due to the lower end thereof being disposed in the recess 122 of the cap 114 and the upper end 128 thereof being disposed in the opening 112. Therefore, no fluid can flow between the upstream seal 128 and the plug 124 unless the fluid pressure in the inlet 104 is sufficiently higher than the fluid pressure in the chamber 108 to deform the lands 146 on the upstream seal 138 as described in connection with FIG. 5. Similarly, no fluid can flow past the downstream seal 140 unless the pressure in the chamber 108 is sufficient to deform the lands 146 of the downstream seal 140, away from the plug 124, also as described in connection with FIG. 5.

Thus, it can be seen that seals, constructed in accordance with the invention, installed in a valve having a valve member fixed against lateral movement, are effective to form both fluid-tight upstream and fluid-tight downstream seals.

If desired, the seals can also be used in connection with a valve having a cylindrical plug that is free to move in the direction of the flow passageway through the valve. With a plug valve of this type, the operation of the valve and seals will be as described in connection of the embodiment of FIG. 1. Also, the seals 138 and 140, when properly configured, will function just as effectively with a tapered cylindrical plug.

EMBODIMENT OF FIG. 9

Referring now to FIG. 9, shown therein and generally designated by the reference character 200 is a gate valve also constructed in accordance with the invention. The gate valve 200 includes a valve body 202 having a partially threaded inlet 204 and a partially threaded outlet 206. A chamber 208 is formed in the valve body 202 and is connected with the inlet 204 and outlet 206. An opening 210 extends upwardly through the valve body 202 from the chamber 208.

A hollow extension 212 is connected to the valve body 202 by a plurality of fasteners 214. The extension 212 has an interior 216 aligned with the opening 210 to accommodate a gate valve member 218. Connected with the upper end of the gate valve member 218 is an operating member 220 that extends upwardly to an operating mechanism (not shown) that is suitably arranged to move the gate valve member 218 into and out of the chamber 208 through the opening 210 and the interior 216 of the extension 212.

A resilient annular upstream seal 222 is disposed in the chamber 208 adjacent the inlet 204 in sealing engagement with the valve body 202. A resilient annular downstream seal 224 is disposed in the chamber 208 adjacent the outlet 206 and is in sealing engagement with the valve body 202. The upstream and downstream seals 222 and 224, respectively, are identical in configuration though oppositely disposed in the chamber 208.

Each of the seals 222 and 224 is provided with a surface 226 that is adapted to sealingly engage the gate valve member 218 when the gate valve member 218 is in the closed position (not shown). The surfaces 226 are provided with a plurality of annular grooves 228 defining a plurality of annular lands 230. Also, in the preferred form of the invention, the surfaces 226 lie in substantially the same plane as the adjacent surface of the valve member 218.

As described in connection with the seals 52 and 54 of FIG. 1, the grooves 228 are widest at the surface 226, that is, adjacent the valve member 218. The lands 230 are of trapezoidal cross-sectional configuration and have the smallest surface thereon in sealing engagement with the valve member 218, thereby providing an optimum low pressure seal and, simultaneously, providing the maximum structural shape to withstand the force of the valve member 218 when the valve member 218 is in the closed position (not shown).

It should be pointed out that the seals 222 and 224 are constructed from the materials described in connection with the construction of the seals 52 and 54 of FIG. 1.

Operation of the embodiment of FIG. 9

As shown in FIG. 9, the valve member 218 is being moved toward the closed position, that is, into a position wherein the flow passageway through the valve 200 is blocked by the presence of the valve member 218. As illustrated in FIG. 9, the fluid pressure in the inlet 204 is sufficient to deform the first land 230 on both the upstream seal 222 and the downstream seal 224, thereby permitting the flow of a small quantity of fluid through the valve 200. It should also be pointed out that the deformation of the lands 230 moves them in a direction relatively away from the valve member 218 so that they will not be damaged as the valve member 218 is moved into the closed position.

After the valve member 218 is moved into the closed position (not shown), the lands 230 are in sealing engagement with the valve member 218 forming both a fluid-tight upstream seal by virtue of the engagement of the upstream seal 222 with the valve member 218 and a fluid-tight downstream seal by virtue of the engagement of the downstream seal 224 with the valve member 218. Again, it should be pointed out that if the valve member 218 were movable in a direction parallel to the flow passageway through the valve (not shown), the downstream seal 224 would form an effective fluid-tight seal with the valve member 218 even though the valve member 218 moves slightly downstream permitting fluid to flow by the upstream seal 222. If the valve member 218 is movable laterally, the seals 222 and 224 function in the manner as described in connection with the seals 52 and 54 of the embodiment of FIG. 1.

FIG. 10 illustrates a slight modification of the valve 200 and all of the parts therein that are identical to those previously described in connection with FIG. 9 will be designated by the same reference characters. As shown therein, the valve 200 includes the body 202 having the inlet 204 and outlet 206 therein. The extension 212 provides for the operation of the valve member 218 as described in connection with the embodiment of FIG. 9. A resilient annular upstream seal 250 and a resilient annular downstream seal 252 are positioned in the chamber 208 and each is provided with a surface 254 that sealingly engages the valve member 218. Each of the seals 250 and 252 is provided with a plurality of grooves 256 defining a plurality of lands 258 that are identical in configuration to the lands 230 and the grooves 228 of the seals 222 and 224.

A pair of reinforcing members 259 are disposed in the chamber 208 adjacent the flow passageway in the valve 200. The reinforcing members 259 include an annular flange 260 that extends outwardly therefrom into a recess 262 in the seals 250 and 252. The reinforcing members 259 function to prevent the extrusion of the seals 250 and 252 from the valve 200 in the event that their pressure rating is exceeded. Generally, the reinforcing members 259 are provided only when the seals 250 and 252 are constructed from a relatively soft material.

The structure and arrangement of the reinforcing members 259 is such that they do not interfere or contact the valve member 218 in the normal operation of the valve 200. However, should the pressure rating of the seals 250 and 252 be exceeded the valve member 218 moves into engagement with the reinforcing members 259 to form a metal-to-metal seal therewith. Also, should the valve become overheated to such an extent that the seals 250 and 252 are destroyed, the reinforcing member 259 provides a secondary seal.

It should be pointed out that all of the foregoing embodiments will function equally as well if the fluid flow or the pressures therein are exerted in the opposite direction to that described. It should also be pointed out that the provision of the relatively narrow surfaces on the lands provide an effective low pressure seal even when a material from which the seals are constructed is relatively hard, but are so designed that they provide the maximum load bearing structure for the seals.

It should be realized that the embodiments described herein are presented by way of example only and that many changes and modifications can be made therein without departing from the spirit of the invention or the scope of the annexed claims.

What I claim is:

1. A valve for use in a fluid handling system, said valve comprising:

a valve body having an inlet, an outlet, and a chamber connected with said inlet and outlet to form a passageway through said body;

a valve member in said valve and movable in said chamber between a position wherein said passageway is open to a position wherein said passageway is closed;

an annular non-metallic, elastomer seal positioned in said chamber around said outlet between said valve member and said body, said seal having a plurality of concentric grooves in the surface thereof facing said valve member defining a plurality of concentric elastomer lands for sealingly engaging said valve member, wherein said grooves are of a depth and width and said seal is sized and positioned in the valve body such that said grooves exists in all operating positions of the valve member, said lands and grooves each being of symmetrical configuration about an imaginary line extending normal to the surface of the valve member engaged by the lands, and said lands being configured and arranged to yield sequentially to fluid pressure acting across the surface of said valve member in a direction normal to said lands so that the sealing ability of said angular seal results from the cumulative sealing ability of the several lands; and means for moving said valve member in a direction to slide upon said lands when said valve is opened and closed.

2. A valve for use in a fluid handling system, said valve comprising:

a valve body having an inlet, an outlet, and a chamber connected with said inlet and outlet to form a passageway through said body;

a valve member in said valve and movable in said chamber between a position wherein said passageway is open to a position wherein said passageway is closed;

a pair of annular non-metallic, elastomer seals located in said chamber encircling said passageway, one of said seals being disposed adjacent said inlet and the other seal being disposed adjacent said outlet, each of said seals having a plurality of annular grooves facing the valve member defining a plurality of annular elastomer lands for sealingly engaging said valve member, wherein the grooves in each of said seals are of a depth and width and each of said seals is sized and positioned in the valve body such that said grooves exist in each seal in all operating positions of the valve member, said lands and grooves each being of symmetrical configuration about an imaginary line extending normal to the surface of the valve member engaged by the lands, and said lands each being configured and arranged to yield sequentially to fluid pressure acting across the surface of said valve member in a direction normal to said lands so that the sealing ability of said annular seal results from the cumulative sealing ability of the several lands; and means for moving said valve member in a direction to slide upon said lands when said valve is opened and closed.

3. The valve of claim 2 wherein said elastomer has a hardness of 80 to 90 durometer.

4. The valve of claim 2 wherein said seals are formed from a resilient synthetic resin.

5. The valve of claim 2 wherein the portion of said lands adjacent said valve member lies in substantially the same plane as the adjacent portion of said valve member.

6. A valve for use in a fluid handling system, said valve comprising:
   a valve body having an inlet, an outlet, and a chamber connected with said inlet and outlet to form a passageway through said body;
   a valve member in said valve body and movable in said chamber between a position wherein said passageway is open to a position wherein said passageway is closed, said valve member also being movable in a direction generally parallel to said passageway;
   a pair of annular non-metallic, elastomer seals located in said chamber encircling said passageway, one of said seals being disposed adjacent said inlet and the other seal being disposed adjacent said outlet, each of said seals having a plurality of annular elastomer grooves defining a plurality of annular lands positioned to sealingly engage said valve member, wherein the grooves in each of said seals are of a depth and width and each of said seals is sized and positioned in the valve body such that said grooves exist in each seal in all operating positions of the valve member, said lands and grooves each being of symmetrical configuration about an imaginary line extending normal to the surface of the valve member engaged by the lands, and said lands being configured and arranged to yield sequentially to fluid pressure acting across the surface of said valve member in a direction normal to said lands so that the sealing ability of said annular seals results from the cumulative sealing ability of the several lands carried by each of said annular seals; and
   means for moving said valve member in a direction to slide upon said lands when said valve is opened and closed.

7. A valve for use in a fluid handling system, said valve comprising:
   a valve body having an inlet, an outlet, and a chamber connected with said inlet and outlet to form a passageway through said body;
   a valve member rotatably positioned in said valve body and having an opening therein adapted, when in one position, to be aligned with said inlet and outlet opening said passageway and, when in another position, to be out of alignment with said inlet and outlet closing said passageway;
   a pair of annular non-metallic, elastomer seals located in said chamber encircling said passageway, one of said seals being disposed adjacent said inlet and the other seal being disposed adjacent said outlet, each of said seals having a plurality of annular grooves facing said valve member and defining a plurality of annular elastomer lands for sealingly engaging said valve member, wherein the grooves in each of said seals are of a depth and width and each of said seals is sized and positioned in the valve body such that said grooves exist in each seal in all operating positions of the valve member, said lands and grooves each being of symmetrical configuration about an imaginary line extending normal to the surface of the valve member engaged by the lands, and said lands each being configured and arranged to yield sequentially to fluid pressure acting across the surface of said valve member in a direction normal to said lands so that the sealing ability of said annular seal results from the cumulative sealing ability of the several lands; and
   means for moving said valve member in a direction to slide upon said lands when said valve is opened and closed.

8. A ball valve comprising:
   a valve body having an inlet, an outlet, and a chamber connected with said inlet and outlet;
   a valve ball rotatably positioned in said chamber and having an opening extending therethrough, said ball being rotatable between a position wherein said opening is aligned with said inlet and outlet thereby forming flow passageway through said valve to a position wherein said opening is not aligned with said inlet and outlet thereby closing said valve;
   a pair of annular non-metallic, elastomer seals disposed in said chamber, one of said seals being disposed adjacent said inlet and the other seal being disposed adjacent said outlet, each of said seals having a plurality of annular grooves formed in the surface thereof in engagement with said valve ball, said grooves defining a plurality of pressure responsive elastomer lands for sealingly engaging said valve ball, and wherein the grooves in each of said seals are of a depth and width and each of said seals is sized and positioned in the valve body such that said grooves exists in each seal in all operating positions of the valve member, said lands and grooves each being of symmetrical configuration about an imaginary line extending normal to the surface of the valve member engaged by the lands, and said lands being configured and arranged to yield sequentially to fluid pressure acting across the surface of said valve member in a direction normal to said lands so that the sealing ability of said annular seal results from the cumulative sealing ability of the several lands; and
   means for moving said valve member in a direction to slide upon said lands when said valve is opened and closed.

9. The valve of claim 8 wherein said seals are constructed from a resilient synthetic resin and each of said seals has a groove formed therein adjacent said valve body; and also including a relatively soft, as compared with said seals, resilient annular seal ring sealingly engaging said seals and said valve body.

10. A plug valve comprising:
   a valve body having an inlet, an outlet, and a chamber connected with said inlet and outlet;
   a generally cylindrical plug member rotatably disposed in said chamber and having an opening extending therethrough, said plug being rotatable between a position wherein said opening is aligned with said inlet and outlet to form a flow passageway through said valve and a position wherein said opening is not aligned with said inlet and outlet and said passageway is closed;
   a pair of non-metallic, elastomer annular seals disposed in said chamber, one of said seals disposed adjacent said inlet and the other seal being disposed adjacent said outlet, each of said seals having a surface configured to fit said plug, said surface having a plurality of grooves therein encircling the opening in said plug and defining a plurality of pressure responsive elastomer lands for sealingly engaging said plug when said plug is in the position closing said passageway, and wherein the grooves in each of said seals are of a depth and width and each of said seals is sized and positioned in the valve body such that said grooves exist in each seal in all operating positions of the plug member, said lands and grooves each being of symmetrical configuration about an imaginary line extending normal to the surface of the valve member engaged by the lands, and said lands being configured and arranged to yield sequentially to fluid pressure acting across the surface of said valve member in a direction normal to said lands so that the sealing ability of said annular seals results from the cumulative sealing ability of the several lands; and
   means for moving said valve member in a direction to slide upon said lands when said valve is opened and closed.

11. A gate valve comprising:
a valve body having an inlet, an outlet, and an elongated chamber connected with said inlet and outlet forming a flow passageway through said valve;
a gate valve member disposed in said chamber and movable therein between a position wherein said flow passageway is open and a position wherein said flow passageway is closed; and,
a pair of resilient annular seals disposed in said chamber, one of said seals being disposed adjacent said inlet and the other seal being disposed adjacent said outlet, each of said seals having a plurality of annular grooves formed in the surface thereof adjacent said valve member, said grooves defining a plurality of pressure responsive lands for sealingly engaging said valve member when said valve member is in the position closing said flow passageway, and wherein the grooves in each of said seals are of a depth and width and each of said seals is sized and positioned in the valve body such that said grooves exist in each seal in all operating positions of the valve member.

12. A gate valve comprising:
a valve body having an inlet, an outlet, and an elongated chamber connected with said inlet and outlet forming a flow passageway through said valve;
a gate valve member disposed in said chamber and movable therein between a position wherein said flow passageway is open and a position wherein said flow passageway is closed; and,
a pair of annular seals constructed from a resilient synthetic resin and disposed in said chamber, one of said seals being disposed adjacent said inlet and the other seal being disposed adjacent said outlet, each of said seals having a plurality of annular grooves formed in the surface thereof adjacent said valve member defining a plurality of pressure responsive lands, each of said grooves being widest adjacent said valve member whereby said lands have a trapezoidal cross-sectional configuration with the smallest surface thereon for sealingly engaging said valve member when said valve member is in the position closing said flow passageway, and wherein the grooves in each of said seals are of a depth and width and each of said seals is sized and positioned in the valve body such that said grooves exist in each seal in all operating positions of the valve member.

13. A valve for use in a fluid handling system, said valve comprising:
a valve body having an inlet, an outlet, and a chamber connected with said inlet and outlet to form a passageway through said body;
a valve member in said valve body and movable in said chamber between a position wherein said passageway is opened to a position wherein said passageway is closed; and
a pair of resilient annular seals located in said chamber encircling said passageway, one of said seals being disposed adjacent said inlet and the other seal being disposed adjacent said outlet, each of said seals having a plurality of annular grooves facing the valve member and defining a plurality of annular lands for sealingly engaging said valve member, each of said grooves being widest at its point adjacent said valve member whereby said lands each have a trapezoidal cross-sectional configuration with the smallest surface thereon being adjacent said valve member, the grooves in each of said seals being of a depth and width, and each of said seals being sized and positioned in the valve body, such that said grooves exist in each seal in all operating positions of the valve member.

14. A plug valve comprising:
a valve body having an inlet, an outlet, and a chamber connected with said inlet and outlet;
a generally cylindrical plug member rotatably disposed in said chamber and having an opening extending therethrough, said plug member being rotatable between a position wherein said opening is aligned with said inlet and outlet to form a flow passageway through said valve and a position wherein said opening is not aligned with said inlet and outlet and said passageway is closed; and
a pair of resilient annular seals disposed in said chamber, one of said seals being disposed adjacent said inlet and the other seal being disposed adjacent said outlet, each of said seals having a surface configured to fit said plug member, said surface having a plurality of grooves therein encircling the opening in said plug member and defining a plurality of pressure responsive lands for sealingly engaging said plug member when said plug member is in the position closing said passageway, said grooves each being widest adjacent said plug member whereby said lands have a trapezoidal cross-sectional configuration with the smallest surface thereon being adjacent said valve member, said grooves being of a depth and width, and said seals being sized and positioned in the valve body, such that said grooves exist in all operating positions of the valve member.

References Cited
UNITED STATES PATENTS

| | | | |
|---|---|---|---|
| 1,679,779 | 8/1928 | Oberhuber | 277—207 X |
| 2,768,643 | 10/1956 | Acomb | 137—505.42 |
| 2,858,098 | 10/1958 | Sanctuary | 251—317 X |
| 2,864,580 | 12/1958 | Lemoine | 251—317 |
| 3,194,571 | 7/1965 | Peichii | 277—208 X |
| 3,235,224 | 2/1966 | Grove | 251—315 X |
| 3,245,655 | 4/1966 | Oetjens | 277—207 X |

WILLIAM F. O'DEA, *Primary Examiner.*

HAROLD W. WEAKLEY, *Assistant Examiner.*